United States Patent [19]

Inagaki et al.

[11] Patent Number: 5,568,467
[45] Date of Patent: Oct. 22, 1996

[54] INFORMATION RECORDING FORMAT HAVING A PLURALITY OF BANDS WITH INDEPENDENT READ AND WRITE CONTROL DATA

[75] Inventors: Masahiro Inagaki; Yoshihisa Fukushima, both of Osaka; Haruo Yamashita, Ibaragi; Yasushi Azumatani, Takatsuki; Hiroshi Hamasaka, Hirakata, all of Japan

[73] Assignee: Matsushita Electric Industrial Co., Ltd., Osaka, Japan

[21] Appl. No.: 234,565

[22] Filed: Apr. 28, 1994

[30] Foreign Application Priority Data

Apr. 28, 1993 [JP] Japan ............................. 5-102377

[51] Int. Cl.$^6$ ............................................. G11B 7/24
[52] U.S. Cl. ............................. 369/275.3; 369/48
[58] Field of Search ........................ 369/275.3, 275.2, 369/275.4, 276, 32, 47, 54, 48; 428/64, 64.4, 64.3; 430/321

[56] References Cited

U.S. PATENT DOCUMENTS

| | | | |
|---|---|---|---|
| 4,750,059 | 6/1988 | Syracuse | 369/59 |
| 4,780,866 | 10/1988 | Syracuse | 369/59 |
| 5,345,435 | 9/1994 | Yamasaki | 369/275.3 |
| 5,388,090 | 2/1995 | Hoshino et al. | 369/275.3 |
| 5,400,309 | 3/1995 | Satomura | 369/32 |

OTHER PUBLICATIONS

"Section 3—Format of Information", *ECMA/TC31/92/100*, pp. 37–40, (Jan. 1993).

*Primary Examiner*—Tan Dinh
*Attorney, Agent, or Firm*—Ratner & Prestia

[57] ABSTRACT

A data recording medium using a format that includes: a data zone having a plurality of bands composed of at least one track, in which user data are written; and a control zone in which band control data are written. Each of the band control data corresponds to a respective one of the plurality of bands. The band control data are independent from each other. The band control data include read control data for a READ operation and write control data for a WRITE operation, which are independent from each other.

10 Claims, 7 Drawing Sheets

INFORMATION RECORDING FORMAT HAVING A PLURALITY OF BANDS WITH INDEPENDENT READ AND WRITE CONTROL DATA

BACKGROUND OF THE INVENTION

1. Field of the Invention

The present invention relates to a data recording medium in which data is written and read on a sector by sector basis, a format for the data recording medium, and a data recording and reproducing device for writing and reading data, using the data recording medium.

2. Description of the Related Art

A data recording medium such as an optical disk has optically detectable guide tracks in a concentric shape or a spiral shape. In the guide tracks, a plurality of tracks are formed. Each track is divided into a plurality of sectors working as a unit for writing data. Furthermore, each sector is composed of a header field in which address data is written and a data field in which data is written.

A number of tracks formed on the data recording medium are classified into a data zone and a control zone in accordance with the contents to be written in the data field. In the data zone, user data is written, and in the control zone, control data for a disk drive device is written. Various physical formats are used for the data zone. For example, ECMA/TC31/92/100 defines a Zoned Constant Angular Velocity (ZCAV) format in which the data zone is divided into a plurality of bands (zones). ECMA/TC31/92/100 also describes a partially embossed ROM disk having a rewritable area and a read-only area in the data zone.

FIG. 6 is a diagram showing a zone structure of the data recording medium, described in the ECMA/TC31/92/100. As shown in this figure, the data recording medium has a control zone including 375 control sectors and a data zone including 10 bands. The number of sectors in each band increases toward the outer periphery of the medium, irrespective of whether the band is a rewritable area or a read-only area. Since a disk motor is controlled so as to rotate an optical disk at a constant speed, the band on the outer track side has a linear velocity higher than that of the band on the inner track side. Thus, in the data recording medium according to the ZCAV format, data is written using a write power having a pulse width gradually shortened and an output gradually increased with a plurality of bands as per unit from the inner track to the outer track. More specifically, Band 0 to Band 3 are represented using write power at Band 0 and write pulse width at Band 0; Band 4 to Band 8 are represented using write power at Band 4 and write pulse width at Band 4.

FIG. 7 is a diagram of a data structure schematically showing the structure of control data to be written in common throughout the control sectors. The control data is written for securing the inter-changeability of the optical disk which is a removable medium. The control data is composed of media characterization data, recording control data, and system data.

Each set of data includes the following parameters: The media characterization data includes parameters regarding an identifier (ID) showing a track format, i.e., the ZCAV format in this example, a modulation code ID, an error correction code ID, and a physical format such as a media type for identifying whether the data recording medium is a rewritable disk, a read-only disk, or a partially embossed ROM disk. The recording control data includes parameters regarding control conditions, such as laser wavelength, disk rotation frequency, maximum read power, and write power and write pulse width with a plurality of bands as one unit. The system data includes parameters regarding area management, such as the number of bands, the number of revolutions per data band, a type ID for identifying whether each band in a partially embossed ROM disk is a rewritable area or a read-only area.

However, the ZCAV format has the following problems:

(1) In general, the sensitivity of a recording material depends on the linear velocity; therefore, as described in the ECMA/TC31/92/100, the capacity of the recording medium must be limited. More specifically, the area of the recording medium partitioned by the innermost periphery of the data zone has a radius of, for example, 24 mm. This radius amounts to about 60% of the radius of the recording medium, i.e., 40 mm. Thus, the capacity of the recording medium is limited although a head is more accessible to the inner track side.

(2) According to the ZCAV format, the number of rotations of a disk motor is controlled to be a predetermined value, so that the data transfer rate is different between the inner track band and the outer track band. In a conventional medium in which only code data is written, the access speed is important for reading the code data, so that the change in the data transfer rate has not caused critical problems. On the other hand, in the future multimedia application, real-time data such as video data and audio data, which are desired to be read at a predetermined speed, is written on the recording medium together with the code data. For this reason, it is required that the data transfer rate is kept at a predetermined value in the zones in which the real-time data is written. However, when a zoned constant linear velocity (ZCLV) format is employed while keeping the data transfer rate at a predetermined value, it takes a long time to read the code data.

(3) Since data in the read-only area is written by cutting with a short wavelength laser having high precision during the production of a disk, data can be written with pits shorter than those of data in the rewritable area in which laser recording is performed by a read-only drive device. Thus, the recording density in the read-only area can be made higher than that in the rewritable area. However, in the conventional partially embossed ROM disk, a sector format in the rewritable area and a sector format in the read-only area use an identical pit length; therefore, the recording density in the read-only area is limited to the recording density of the rewritable area, making it impossible to increase the capacity of the read-only area.

SUMMARY OF THE INVENTION

The data recording medium of this invention, comprises: a data zone having a plurality of bands composed of at least one track, in which user data is written; and a control zone having read and write control data including read control data for a READ operation and write control data for a WRITE operation, the write control data being independent from the read control data, in which band control data having a one-to-one correspondence with each band of the data zone is written.

In one embodiment of the present invention, the band control data includes a band type code for identifying whether the band corresponding to the band control data is a rewritable area or a read-only area.

In another embodiment of the present invention, the data recording medium is in a disk shape and the read and write control data includes an operation mode for identifying whether a rotation control of a disk motor for rotating the data recording medium is in a CAV mode in which an angular speed is set at a predetermined value or a CLV mode in which a data transfer rate is set at a predetermined value.

In another embodiment of the present invention, the read and write control data of the band control data is set so that the READ operation is done in the CAV mode and the WRITE operation is done in the CLV mode.

In another embodiment of the present invention, the data zone includes a random access area attaching importance to an access speed and a sequential access area in which a predetermined data transfer rate is maintained, the band control data corresponding to a band contained in the random access area is set at a control value corresponding to a ZCAV format, and the control data corresponding to a band contained in the sequential access area is set at a control value corresponding to a ZCLV format.

In another embodiment of the present invention, the random access area is allocated to an inner track side of the data zone and the sequential access area is allocated to an outer track side of the data zone.

In another embodiment of the present invention, the data zone includes a rewritable area and a read-only area in which data is written at a density higher than that in the rewritable area, a clock frequency control value of the control data corresponding to a band contained in the read-only area is set to be higher than a clock frequency control value of the control data corresponding to a band contained in the rewritable area.

According to another aspect of the present invention, a data recording and reproducing device performs data READ and WRITE operations in a data recording medium comprising a plurality of bands composed of at least one track, a data zone in which user data is written, read and write control data including read control data for the READ operation and write control data for the WRITE operation, the write control data being independent from the read control data, and a control zone in which control data including band control data having a one-to-one correspondence with each band of the data zone is written. The device comprises: recording means for writing user data in the data recording medium; reproducing means for reading the user data and the control data from the data recording medium; control data memory means for temporarily storing the control data read from the control zone by the reproducing means; and control means for respectively controlling the WRITE operation of the user data using the recording means and the READ operation of the user data using the reproducing means, based on the control data stored in the control data memory means.

In one embodiment of the present invention, the track of the data recording medium has a plurality of sectors, the data recording medium writes and reads data on a sector basis, and the control means sets the read and write control data of a band in which a target sector is positioned during a seek operation for detecting the target sector.

According to another aspect of the present invention in a format of a data recording medium, a data zone and a control zone are allocated to the data recording medium, the data zone having a plurality of bands composed of at least one track, in which user data is written, the control zone having read and write control data including read control data for a READ operation and write control data for a WRITE operation. The write control data is independent from the read control data, in which band control data having a one-to-one correspondence with each band of the data zone is written.

The data recording medium of the present invention has a data zone and a control zone. The data zone includes a plurality of bands each composed of at least one track, and user data is written therein, In the control zone, at least, the band control data is written. The band control data includes control data for controlling a WRITE operation and control data for controlling a READ operation, which are independent from each other. Because of this structure, the mode for the WRITE operation and the mode for the READ operation can be independently set with respect to the data recording medium. That is, the WRITE operation uses a CLV mode and the READ operation uses a CAV mode. In the CLV mode, the data transfer rate is set at a predetermined value, and in the CAV mode, the disk motor controls the rotation of the optical disk so that the angular velocity is set at a predetermined value.

Furthermore, according to the present invention, the control data and the bands of the data zone have a one-to-one correspondence. Since the operation mode and other control parameters can be set on a band basis, even in a data recording medium having a random access area and a sequential access area or a partial embossed ROM disk having a rewritable area and a read-only area, the read and write control with respect to each area can be optimized.

Thus, the invention described herein makes possible the advantages of (1) providing a format enabling data writing in the innermost possible zone while using a recording material having line velocity dependence, a data recording medium using the format, and a data recording and reproducing device controlling data READ and WRITE operations, using the data recording medium; (2) providing a format enabling high-speed reading of code data and a predetermined data transfer rate of real time data in a data recording medium writing the code data and the real time data, a data recording medium using the format, and a data recording and reproducing device controlling data READ and WRITE operations, using the data recording medium; (3) providing a format enabling data writing at high density in a read-only area of a partially embossed ROM disk, a data recording medium using the format, and a data recording and reproducing device controlling data READ and WRITE operations, using the data recording medium.

These and other advantages of the present invention will become apparent to those skilled in the art upon reading and understanding the following detailed description with reference to the accompanying

DESCRIPTION OF THE PREFERRED EMBODIMENTS

Hereinafter, the present invention will be described by way of illustrative examples with reference to the drawings.

Figure 6:
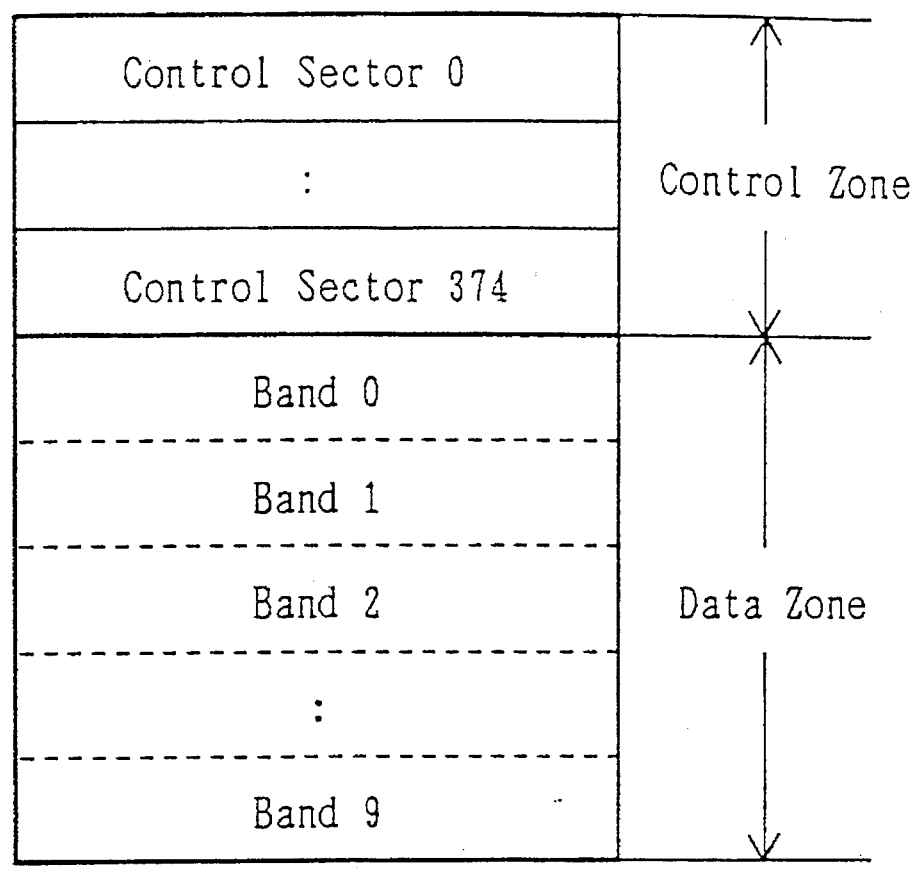
FIG. 6 is a diagram showing a zone structure of a conventional data recording medium.
Figure 7:
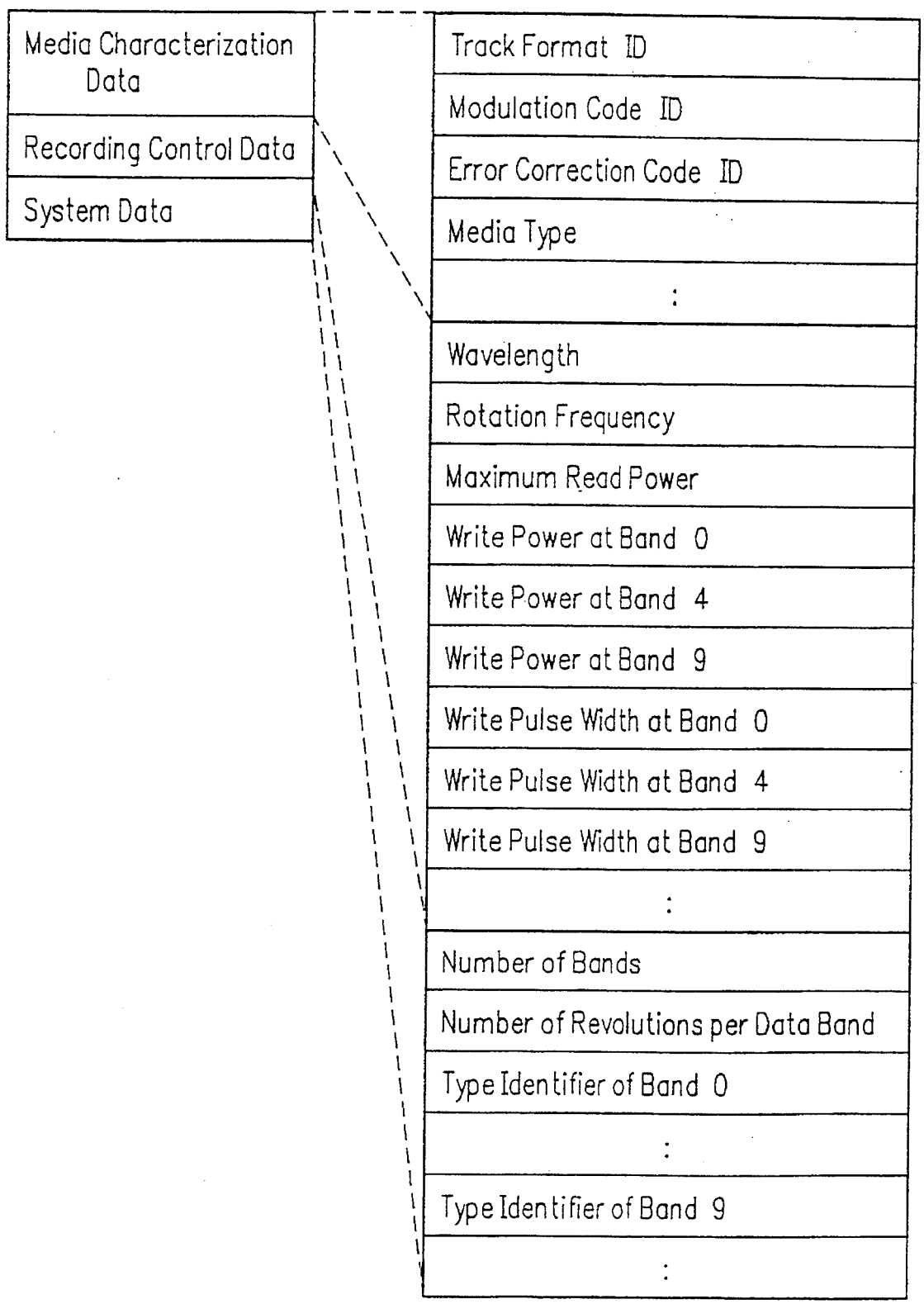
FIG. 7 shows a data structure of control data written in the conventional data recording medium.

In the same way as in the conventional example illustrated with reference to FIG. 6, a data recording medium of the present invention is composed of a data zone in which user data is written and a control zone in which control data of a disk drive device is written. The data zone is divided into a plurality of bands, and each band is composed of a plurality of physical tracks. Each physical track is divided into a plurality of sectors working as a unit of writing data. Fundamentally, the number of sectors in each band increases toward the outer track of the medium.

Figure 1:
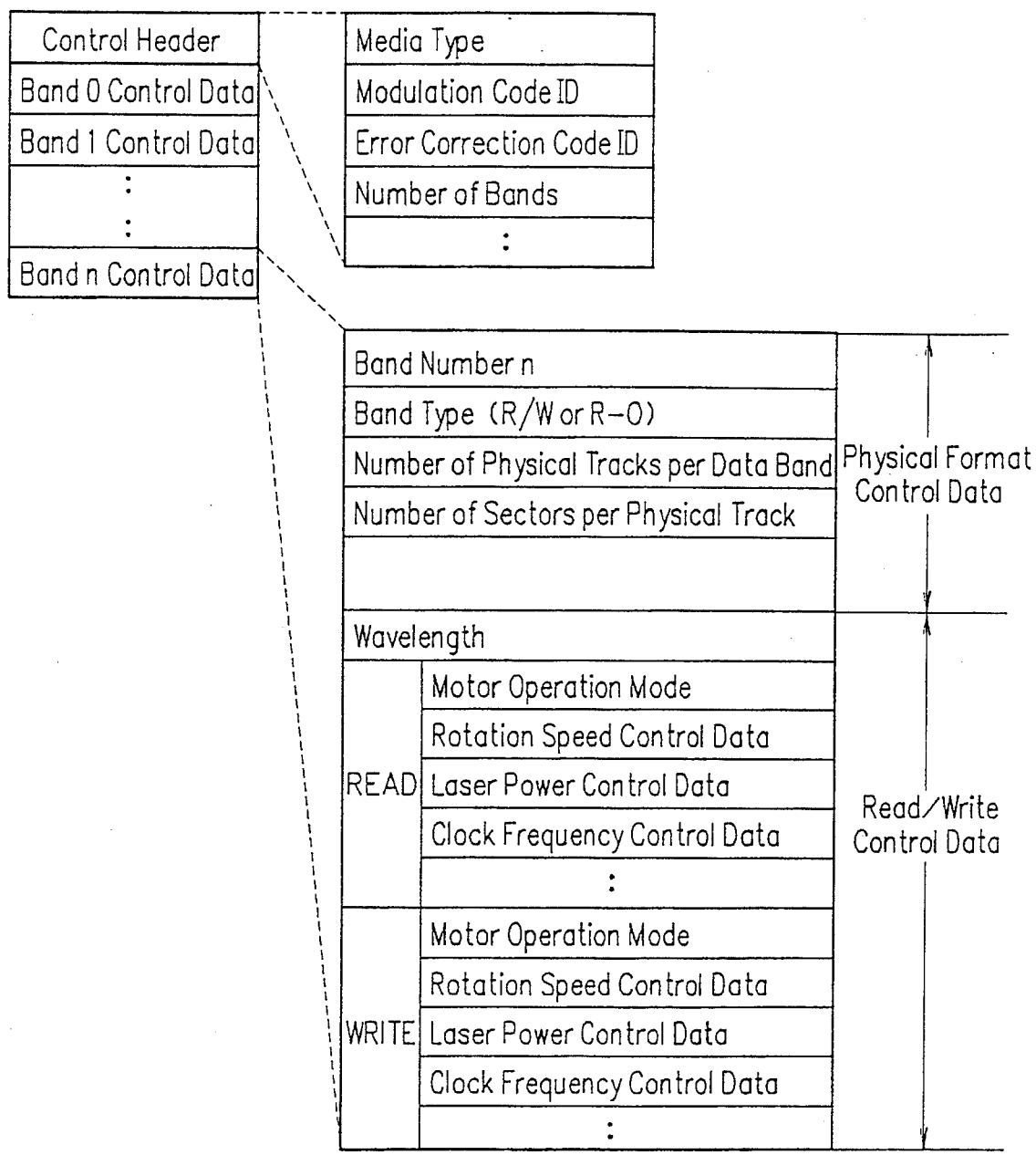
FIG. 1 is a diagram showing a data structure of control data written in a data recording medium of the present invention.

FIG. 1 is a diagram showing the data structure of control data recorded in the data recording medium of the present invention. This data structure is common to the examples described later.

As shown in FIG. 1, the control data of the present invention is composed of a control header including control data common to the entire disk and band control data including control data having a one-to-one correspondence with each band. The control header includes: a media type for identifying whether the data recording medium is a rewritable disk, a read-only disk, or a partially embossed ROM disk; a modulation code ID; an error correction code ID, and the number of bands; and the like. The band control data includes physical format control data and read/write control data. The physical format control data includes a band number, a band type for identifying whether the band is a rewritable area or a read-only area, the number of physical tracks per data band, the number of sectors per physical track, and the like. The read/write control data includes: a motor operation mode for identifying whether the rotation control of a disk motor is a CAV mode in which an angular velocity is set at a predetermined value or a CLV mode in which a data transfer rate is set at a predetermined value; rotation speed control data; laser power control data; clock frequency control data; and the like. Each value of these read/write control data is set for reading and writing, respectively, using a laser wavelength as a parameter.

EXAMPLE 1

A data recording medium of Example 1 is characterized as follows: (1) A data WRITE operation is performed using a ZCLV format in which a predetermined data transfer rate is maintained by decreasing the number of rotations of a disk toward the band on the outer track side; and (2) A data READ operation is performed using a ZCAV format in which a predetermined number of rotations of the disk is maintained throughout the bands. In such an information recording medium, band control data set in the following manner is written. During reading data, a laser power and a clock frequency are set so as to become higher corresponding to the increase in linear velocity toward the band on the outer track side. During writing data, a laser power and a clock frequency are set at predetermined values because there is no change in data transfer rate.

Table 1 shows main parameters contained in the band control data written in the data recording medium in Example 1.

TABLE 1

| Band Number | | 0 | 1 | 2 | 3 | 4 | 5 | ... | 18 |
|---|---|---|---|---|---|---|---|---|---|
| Band Type | | R/W | R/W | R/W | R/W | R/W | R/W | | R/W |
| Number of Sectors per Physical Track | | 24 | 26 | 28 | 30 | 32 | 34 | | 60 |
| READ | Motor Operation Mode | CAV | CAV | CAV | CAV | CAV | CAV | | CAV |
| | Rotation Speed (rpm) | 3000 | 3000 | 3000 | 3000 | 3000 | 3000 | | 3000 |
| | Laser Power (mW) | 0.60 | 0.65 | 0.70 | 0.75 | 0.80 | 0.85 | | 1.50 |
| | Clock Frequency (MHz) | 12.0 | 13.0 | 14.0 | 15.0 | 16.0 | 17.0 | | 30.0 |
| WRITE | Motor Operation Mode | CLV | CLV | CLV | CLV | CLV | CLV | | CLV |
| | Rotation Speed (rpm) | 3000 | 2769 | 2571 | 2400 | 2250 | 2118 | | 1200 |
| | Laser Power (mW) | 12.0 | 12.0 | 12.0 | 12.0 | 12.0 | 12.0 | | 12.0 |
| | Clock Frequency (MHz) | 12.0 | 12.0 | 12.0 | 12.0 | 12.0 | 12.0 | | 12.0 |

As is understood from Table 1, the data zone (the entire zone is composed of rewritable areas) is divided into 19 bands, i.e., Band 0 to Band 18, and the number of sectors per physical track in each band is 24 to 60. Among the band control data, a laser power and a clock frequency for reading data increase at a predetermined rate in proportion to the number of sectors per physical track toward the band on the outer track side, while a motor rotation speed for reading data decreases in inverse proportion to the number of sectors per physical track toward the band on the outer track side.

Figure 2A:
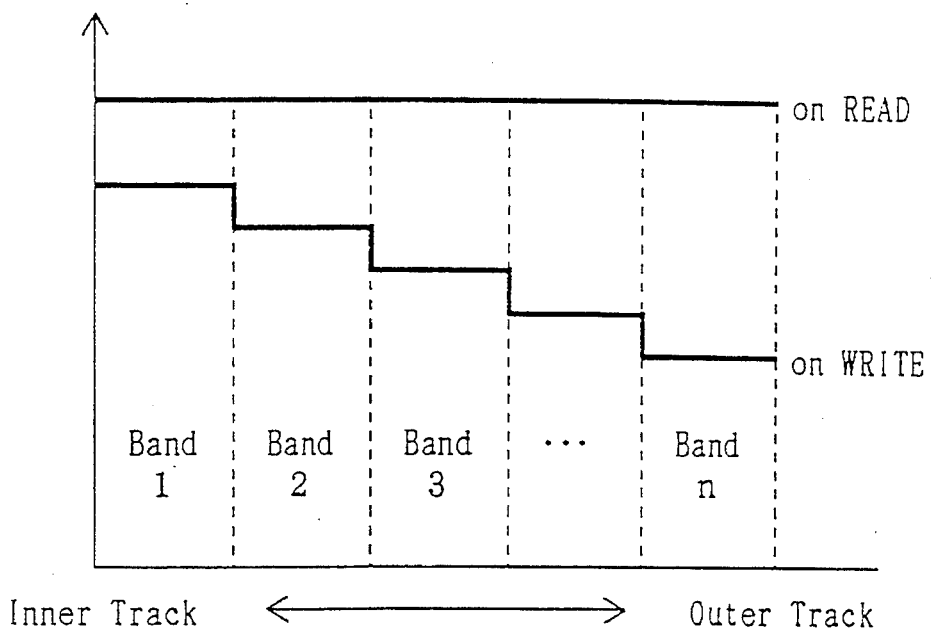
FIGS. 2A and 2B are graphs showing main parameters contained in band control data written in a data recording medium in Example 1 of the present invention.
Figure 2B:
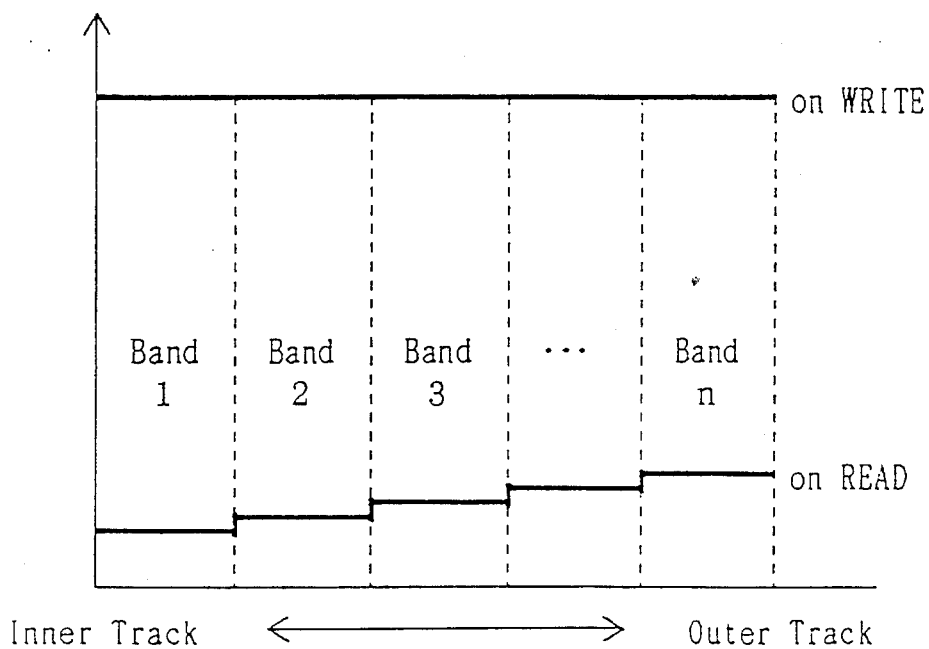

FIGS. 2A and 2B are graphs schematically showing the change in motor rotation speed and in laser power among the parameters shown in Table 1.

According to Example 1, only the data WRITE operation uses the ZCLV format, so that a laser power during writing data can be maintained at a predetermined value. Thus, unlike the conventional ZCAV format, the radius of the area of the recording medium partitioned by the innermost periphery of the data zone is not limited. Thus, the data zone can be extended to the largest possible area of the disk.

EXAMPLE 2

In a data recording medium of Example 2, a data zone is classified into a random access area and a sequential access area on a band basis. In the random access area, code data is written, and in the sequential access area, real time data is written. The data recording medium of Example 2 is characterized as follows: The data READ and WRITE operations are performed using the ZCAV format in each band allocated to the random access zone, and the data READ and WRITE operations are performed using the ZCLV format in each band allocated to the sequential access area. In such an information recording medium, band control data set in the following manner is written. In the random access area, a laser power and a clock frequency are set so as to become higher corresponding to the increase in line velocity toward the band on the outer track side. In the sequential access area, a laser power and a clock frequency are set at predetermined values because there is no change in the data transfer rate.

Table 2 shows main parameters contained in the band control data written in the information recording medium in Example 2.

TABLE 2

| Band Number | | 0 | 1 | 2 | 3 | 4 | 5 | ... | 18 |
|---|---|---|---|---|---|---|---|---|---|
| Band Type | | R/W | R/W | R/W | R/W | R/W | R/W | | R/W |
| Number of Sectors per Physical Track | | 24 | 26 | 28 | 30 | 32 | 34 | | 60 |
| READ | Motor Operation Mode | CAV | CAV | CAV | CAV | CAV | CLV | | CLV |
| | Rotation Speed (rpm) | 3000 | 3000 | 3000 | 3000 | 3000 | 2824 | | 1600 |
| | Laser Power (mW) | 0.60 | 0.65 | 0.70 | 0.75 | 0.80 | 0.80 | | 0.80 |
| | Frequency (MHz) | 12.0 | 13.0 | 14.0 | 15.0 | 16.0 | 16.0 | | 16.0 |
| WRITE | Motor Operation Mode | CAV | CAV | CAV | CAV | CAV | CLV | | CLV |
| | Rotation Speed (rpm) | 3000 | 3000 | 3000 | 3000 | 3000 | 2824 | | 1600 |
| | Laser Power (mW) | 12.0 | 13.0 | 14.0 | 15.0 | 16.0 | 16.0 | | 16.0 |
| | Clock Frequency (mHz) | 12.0 | 13.0 | 14.0 | 15.0 | 16.0 | 16.0 | | 6.0 |

As is understood from Table 2, the data zone (the entire zone is composed of rewritable areas) is divided into 19 bands, i.e., Band 0 to Band 18 in the same way as in Example 1. Band 0 to Band 4 are allocated to the random access area, and Band 5 to Band 18 are allocated to the sequential access area. It is determined based on the motor operation mode, i.e., a CAV format or a CLV format, which area the band is allocated to. More specifically, if the motor operation mode of the band is set to the CAV format, the band is determined to be allocated to the random access area, and if the motor operation mode of the band is set to the CLV format, the band is determined to be allocated to the sequential access area. Among the band control data, a laser power and a clock frequency for the bands in the random access area increase in proportion to the number of sectors per physical track toward the band on the outer track side, while a motor rotation speed for the bands in the random access area decrease in inverse proportion to the number of sectors per physical track toward the band on the outer track side.

Figure 3A:
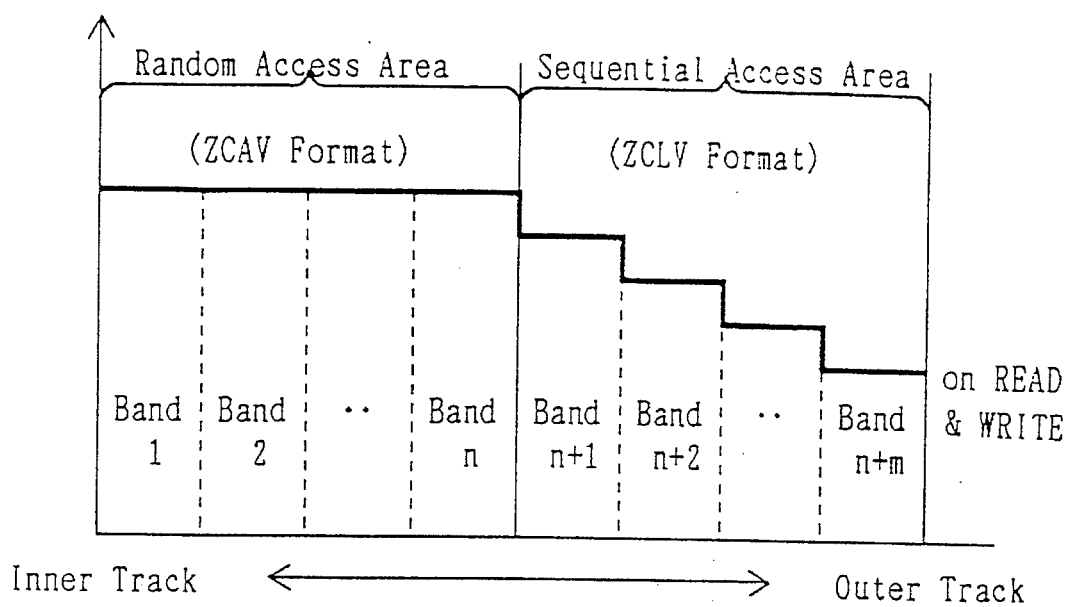
FIGS. 3A and 3B are graphs showing the main parameters contained in band control data written in a data recording medium in Example 2 of the present invention.
Figure 3B:
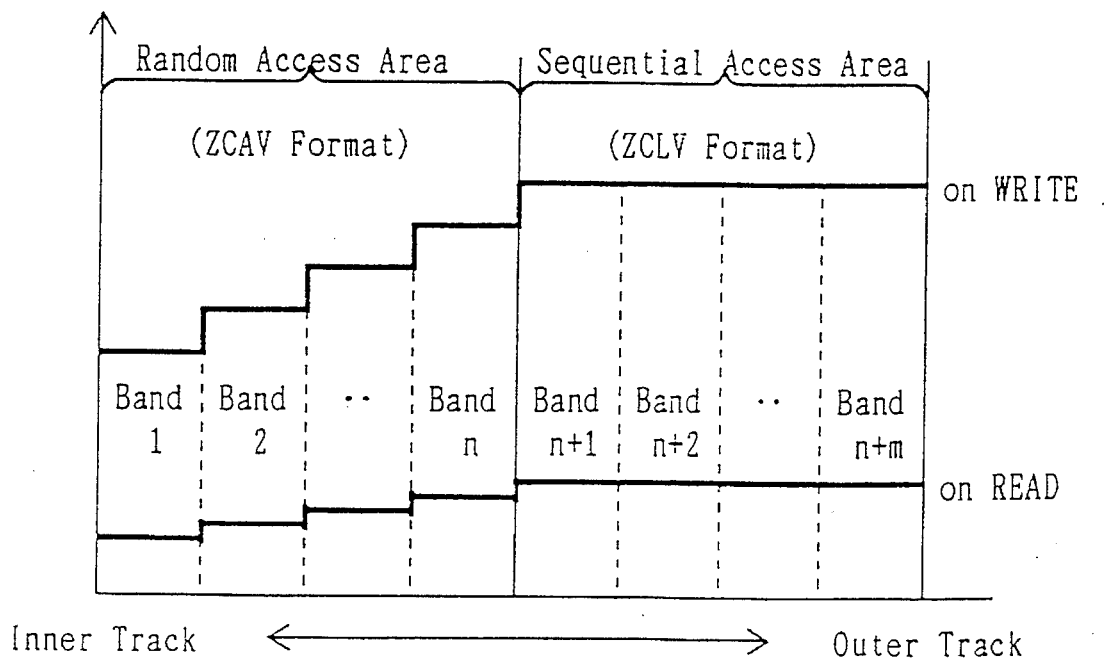

FIGS. 3A and 3B are graphs schematically showing the change in motor rotation speed and in laser power among the parameters shown in Table 2.

In Example 2, the sequential access area in which a predetermined laser power is maintained is allocated to the outer track side, so that the output of the laser power during writing data can be suppressed. Because of this, the drive device uses a laser with a small output, lowering cost, and the number of rotations can be set at a high level throughout the disk without increasing the laser output, thereby improving access speed.

EXAMPLE 3

A data recording medium of the present invention is a partially embossed ROM disk in which a data zone is classified into a rewritable area and a read-only area on a band basis. Since data is written in the read-only area with a laser having a wavelength shorter than that of a laser used in a conventional drive device for writing data in the rewritable area, a pit length in the read-only area can be made shorter than that in the rewritable area. Thus, in each band allocated to the read-only area of the partially embossed ROM disk, the number of sectors per physical track is larger than that in the rewritable area.

Table 3 shows main parameters contained in the band control data written in the information recording medium in Example 3.

TABLE 3

| Band Number | | 0 | 1 | 2 | 3 | 4 | 5 | ... | 18 |
|---|---|---|---|---|---|---|---|---|---|
| Band Type | | R/W | R/W | R/W | R/W | R-O | R-O | | R-O |
| Number of Sectors per Physical Track | | 24 | 26 | 28 | 30 | 48 | 51 | | 90 |
| READ | Motor Operation Mode | CAV | CAV | CAV | CAV | CAV | CAV | | CAV |
| | Rotation Speed (rpm) | 3000 | 3000 | 3000 | 3000 | 3000 | 3000 | | 3000 |
| | Laser Power (mW) | 0.60 | 0.65 | 0.70 | 0.75 | 0.80 | 0.85 | | 1.50 |
| | Clock Frequency (MHz) | 12.0 | 13.0 | 14.0 | 15.0 | 24.0 | 25.5 | | 45.0 |
| WRITE | Motor Operation Mode | CAV | CAV | CAV | CAV | Res. | Res. | | Res. |
| | Rotation Speed (rpm) | 3000 | 3000 | 3000 | 3000 | Res. | Res. | | Res. |
| | Laser Power (mW) | 12.0 | 13.0 | 14.0 | 15.0 | Res. | Res. | | Res. |
| | Clock Frequency (MHz) | 12.0 | 13.0 | 14.0 | 15.0 | Res. | Res. | | Res. |

As is understood from Table 3, the data zone is divided into 19 bands in the same way as in Example 1 and uses the ZCAV format. Band 0 to Band 3 are allocated to the rewritable area and Band 4 to Band 19 are allocated to the read-only area. It is determined based on the band type, i.e., a rewritable type or a read-only type, which area the band is allocated to. More specifically, if the band type is a rewritable one, the band is determined to be allocated to the rewritable area, and if the band type is a read-only one, the band is determined to be allocated to the read-only area. In each band allocated to the rewritable area, the number of sectors per physical track is set at the same number as that of Example 1. On the other hand, in each band allocated to the read-only area, since data is written with density higher than that in the rewritable area, the number of sectors per physical track is set at 1.5 times that of Example 1. Thus, the laser power and the clock frequency for reading data increase in proportion to the increase in line recording density. In the read-only area, the data WRITE operation is inhibited, so that the control data for writing data is set to be reserved.

In Example 3, the read-only area requiring no data WRITE operation is allocated to the outer track side, so that the laser power output during writing data can be suppressed. Because of this, the drive device uses a laser with a small output, lowering cost and the number of rotations can be set at a high level throughout the disk without increasing the laser output, thereby improving access speed.

As described above, Examples 1 to 3 are characterized as follows: In Example 1, only the data WRITE operation uses the ZCLV format to increase the capacity of the data zone; in Example 2, the random access area and the sequential access area are present on the identical medium; and in Example 3, the read-only area has a recording density higher than that of the rewritable area. Herein, these examples have been independently described. However, in the data recording medium of the present invention, the allocation of the random access area and the sequential access area and the allocation of the rewritable area and the read-only area can be arbitrarily combined on a band basis. For example, by combining Examples 2 and 3, a data recording medium, in which Band 0 to Band 3 are allocated to the rewritable sequential access area and Band 4 to Band 19 are allocated to the read-only sequential access area, can be realized.

EXAMPLE 4

Figure 4:
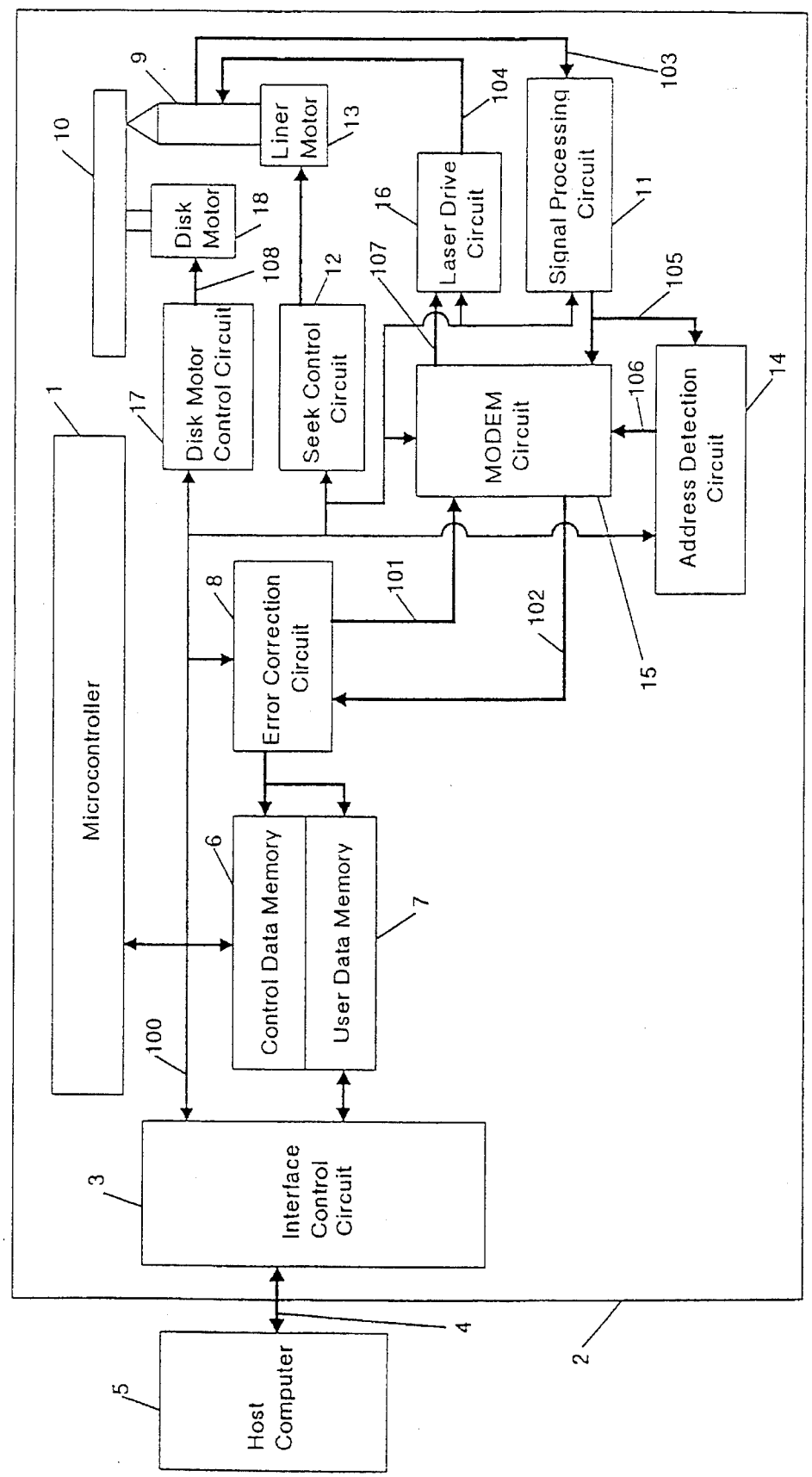
FIG. 4 is a block diagram of a data recording and reproducing device in Example 4 of the present invention.

A data recording and reproducing device of Example 4 uses the data recording media described in Examples 1 to 3. FIG. 4 shows a block diagram of the data recording and reproducing device of Example 4. Hereinafter, the structure of the device will be described with reference to FIG. 4.

As shown in FIG. 4, a data recording and reproducing device 2 includes a microcontroller 1, an interface control circuit 3, and a host interface 4 such as a small computer system interface (SCSI). The microcontroller 1 controls the data recording and reproducing device 2 in accordance with the control procedure stored therein. The interface control circuit 3 is connected to an external host computer 5 through the host interface 4. Control data such as device command and sense data are received between the interface control circuit 3 and the microcontroller 1 through a control bus 100.

The data recording and reproducing device 2 further includes a control data memory 6, a user data memory 7, and an error correction circuit 8. The control data memory 6 temporarily stores control data read from a control zone of a data recording medium 10. The user data memory 7 temporarily stores data read from or written in a data zone of the data recording medium 10. On WRITE operation, the error correction circuit 8 gives an error correction code to the user data stored in the user data memory 7 to generate write data 101, while on READ operation, the error correction circuit 8 detects and corrects an error contained in read data 102 with the error correction code.

The data recording and reproducing device 2 further includes an optical head 9, a signal processing circuit 11, a seek control circuit 12, a linear motor circuit 13, an address detection circuit 14, a modulation/demodulation circuit 15, a laser drive circuit 16, a motor control circuit 17, and a disk motor 18. The optical head 9 detects and converts light reflected from the data recording medium 10 into an electric signal which is a preamplifier output signal 103, and on WRITE operation, drives a laser in accordance with a laser drive signal 104 to write data in a data field of the target sector. The signal processing circuit 11 performs an analog signal processing such as a gain control and binaryzation using a PLL with respect to the preamplifier output signal 103 to generate a read signal 105. The seek control circuit 12 drives the linear motor circuit 13 in accordance with the control data from the microcontroller 1 to perform a seek operation with respect to a target track. The address detection circuit 14 detects an address signal recorded in a header field of a sector from the read signal 105 and performs an identity detection between the address signal and a target sector address set by the microcontroller 1; When the identity is detected, the address detection circuit 14 transmits a write sector detection signal 106. The data modulation/demodulation circuit 15 demodulates the read signal 105 read from the data field of the sector to generate the read data 102 upon detecting the target sector detection signal 106 on READ operation, and on WRITE operation, the data modulation/demodulation circuit 15 modulates the write data 101 to transmit a write signal 107. At this time, the laser drive circuit 16 transmits the laser drive signal 104 in accordance with a laser power control value previously set by the microcontroller 1 to drive a laser in the optical head 9, thereby writing data in the data field of the target sector. The motor control circuit 17 transmits a motor control signal 108 in accordance with a motor rotation control value which is set by the microcontroller 1 so as to correspond to a band in which the target sector is positioned, whereby the number of rotations of the disk motor 18 is controlled.

Hereinafter, the data READ and WRITE operations will be described, which are performed by the data recording and reproducing device 2 constructed as described above, using the data recording medium having a data structure described in Examples 1 to 3.

First, upon detecting that the data recording medium is loaded or a reset operation is performed, the microcontroller 1 performs a READ operation of control data from the control zone. At this time, the microcontroller 1 sets, in the laser drive circuit 16 and the signal processing circuit 11, respectively, a laser power control value and a clock frequency control value corresponding to the data READ operation from the control zone allocated to the innermost zone and then drives the disk motor 18. When the rotation of the disk motor 18 becomes stable, the microcontroller 1 drives the seek control circuit 12 to perform the seek operation with respect to the control zone.

Next, the microcontroller 1 sets the address of the control zone as a target sector address in the address detection circuit 14. The address detection circuit 14 transmits the target sector detection signal 106 to drive the data modulation/demodulation circuit 15 upon detecting the address of the target sector from the read signal 105. The data modulation/demodulation circuit 15 demodulates data from the read signal 105 and the error correction circuit 8 performs an error correction processing with respect to the read data 102. In such a series of processing, the control data read from the control zone is stored in the control data memory 6.

Figure 5:
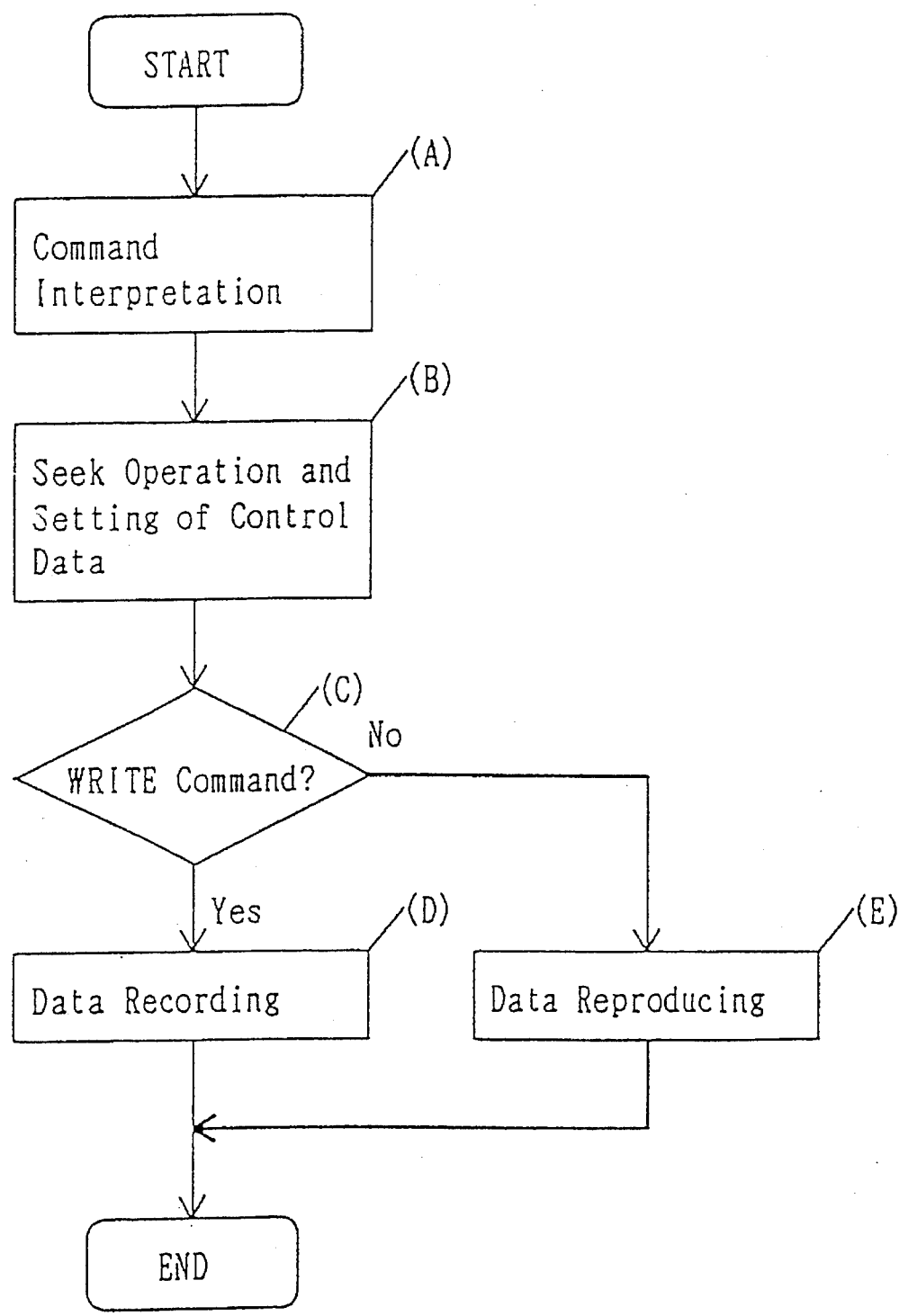
FIG. 5 is a flow chart illustrating data READ and WRITE operations performed by the data recording and reproducing device of the present invention.

Hereinafter, the data READ and WRITE operations will be described with reference to the flow chart of FIG. 5. These are performed by the data recording and reproducing device 2 using the data recording medium having a data structure described in Examples 1 to 3. In the following description, it is intended that the address data written in the header field of each sector of the data recording medium is written using a modulation method in which the address data can be always read without depending upon the number of rotations of a disk, like a PE modulation method.

(A) The host computer 5 transmits the device command to the interface control circuit 3 through the host interface 4 to start the data READ and WRITE operations. Upon reading out the device command from the interface control circuit 3, the microcontroller 1 calculates a band number in which the target sector designated by the device command is positioned in accordance with the physical format control data contained in the control data stored in the control data memory 7.

(B) Next, the microcontroller 1 drives the seek control circuit 12 to perform the seek operation with respect to a track in which the target sector is positioned. During the seek operation, the microcontroller 1 reads the read/write control data in the band in which the target sector is positioned and sets laser power control values for reading and writing in the laser drive circuit 16. It is noted that in the laser drive circuit 16, the laser power control values for reading and writing are separately stored. Then, the microcontroller 1 sets a motor rotation control value for reading or writing in the motor control circuit 17, in accordance with whether the device command is WRITE command or READ command, thereby varying the number of rotations of the disk motor 18. Furthermore, the microcontroller 1 sets a clock frequency control value for writing in the data modulation/demodulation circuit 15 when the device command is WRITE command, and sets a clock frequency control value for reading in the signal processing circuit 11 when the device command is READ command. The microcontroller 1 reads an address from the address detection circuit 14 and confirms a track address to complete the seek operation.

(C) The microcontroller 1 performs a processing procedure (D) when interpreting that the device command is a WRITE command in a processing procedure (A), while the microcontroller 1 performs a processing procedure (E) when interpreting that the device command is a READ command in the processing procedure (A).

(D) When the device command is a WRITE command, the microcontroller 1 drives the interface control circuit 3 to transmit the user data from the host computer 5 to the user data memory 7. Then, the microcontroller 1 drives the error correction circuit 8 to give an error correction code to the user data thus transmitted. The address detection circuit 14 detects the address of the target sector set by the microcontroller 1, and upon detecting the target sector, transmits the target sector detection signal 106 to drive the data modulation/demodulation circuit 15. The data modulation/demodulation circuit 15 modulates the write data 101 from the error correction circuit 8 and transmits the generated write signal 107 to the laser drive circuit 16 to perform the data WRITE operation with respect to the data field of the target sector. In the data WRITE operation with respect to a plurality of sectors, the data transfer operation with the host computer 5, the processing for adding the error correction code, and the data modulation operation are performed in parallel. When the data WRITE operation with respect to all of the target sectors is completed, the microcontroller 1 returns a command status to the host computer 5 through the interface control circuit 3 to complete the command execution.

(E) When the device command is a READ command, a laser power control value and a clock frequency control value for reading, and a motor rotation control value have already been set in the processing procedure (B). In the data READ operation, the microcontroller 1 sets, in the address detection circuit 14, the address of the target sector from which data is read. Upon detecting the address of the target sector from the read signal 105, the address detection circuit 14 transmits the target sector detection signal 106 to drive the data modulation/demodulation circuit 15, and the data modulation/demodulation circuit 15 demodulates data from the read signal 105. Then, the error correction circuit 8 performs the error correction processing with respect to the read data 102, and the user data treated with the error correction processing is once stored in the user data memory 7. The microcontroller 1 drives the interface control circuit 3 to transmit the user data from the user data memory 7 to the host computer 5. In the data READ operation with respect to a plurality of sectors, the data demodulation operation, the error correction processing, and the data transfer operation with the host computer 5 are performed in parallel. When the data READ operation with respect to all of the target sectors is completed, the microcontroller 1 returns a command status to the host computer 5 through the interface control circuit 3 to complete the command execution.

In the above data READ and WRITE operations, when the motor rotation control which takes a relatively long time to be executed is performed in parallel with the seek operation, the access time can be shortened. In the above description, although the laser power control value and the clock frequency control value are set in the processing procedure (B), these parameters can also be set in the data WRITE operation in the processing procedure (D) or in the data READ operation in the processing procedure (E). When the data recording and reproducing areas extend over a plurality of bands, it is obvious that the microcontroller 1 resets control data at a time when a band number in which the target sector is positioned is changed in the processing procedure (D) or in the processing procedure (E). The laser power control value for reading changes in a range smaller than that for writing; therefore, the data READ operation can be performed with the laser power control value set at a predetermined value, unless the recording material on the disk is damaged.

As described above, in the data recording and reproducing device of the present invention, the control data set on a band basis is read and stored in the device, and the control parameters such as the motor rotation control value, the laser power control value, and the clock frequency control value are set so as to correspond to the kind of device command and a band in which the target sector is positioned. Because of this structure, the data READ and WRITE operations suitable for various data recording media as described in Examples 1 through 3 can be performed.

For example, by using the data recording medium as in described in Example 1 in which a laser power on WRITE operation is set at a predetermined value, while a laser with an output lower than that used in the conventional device is used, a data zone can be enlarged to the innermost possible track to which the head has access, thereby markedly increasing the capacity of the medium. In addition, by using the data recording medium as described in Example 2 in which the random access area and the sequential access area are allocated, the data recording and reproducing device of the present invention can read and write code data and real time data, such as video data and audio data indispensable for the multimedia application, on the identical disk. Furthermore, by using the data recording medium which is a partially embossed ROM disk composed of the rewritable area and the read-only area in which data is recorded at density higher than that in the rewritable area as described in Example 3, the data recording and reproducing device can perform the data READ operation from the read-only area having a capacity larger than that of the conventional one.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data recording medium comprising:

a data zone having a plurality of bands composed of at least one track, in which user data are written; and a control zone in which a plurality of band control data are written, each of the band control data corresponding to a respective one of the plurality of bands;

wherein the band control data are independent from each other, and the band control data include read control data for a READ operation and write control data for a WRITE operation which are independent frown each other.

2. A data recording medium according to claim 1, wherein the band control data includes a band type code for identifying whether the band corresponding to the band control data is a rewritable area or a read-only area.

3. A data recording medium according to claim 1, wherein the data recording medium is in a disk shape and the read and write control data includes an operation mode for identifying whether a rotation control of a disk motor for rotating the data recording medium is in a CAV mode in which an angular speed is set at a predetermined value or a CLV mode in which a data transfer rate is set at a predetermined value.

4. A data recording medium according to claim 3, wherein the read and write control data of the band control data is set so that the READ operation is done in the CAV mode and the WRITE operation is done in the CLV mode.

5. A data recording medium according to claim 1, wherein the data zone includes a random access area attaching importance to an access speed and a sequential access area in which a predetermined data transfer rate is maintained, the band control data corresponding to a band contained in the random access area is set at a control value corresponding to a ZCAV format, and the control data corresponding to a band contained in the sequential access area is set at a control value corresponding to a ZCLV format.

6. A data recording medium according to claim 5, wherein the random access area is allocated to an inner track side of the data zone and the sequential access area is allocated to an outer track side of the data zone.

7. A data recording medium according to claim 1, wherein the data zone includes a rewritable area and a read-only area in which data is written at a density higher than that in the rewritable area, a clock frequency control value of the control data corresponding to a band contained in the read-only area is set to be higher than a clock frequency control value of the control data corresponding to a band contained in the rewritable area.

8. A data recording and reproducing device performing data READ and WRITE operations in a data recording medium comprising a plurality of bands composed of at least one track, a data zone in which user data is written, read and write control data including read control data for the READ operation and write control data for the WRITE operation, the write control data being independent from the read control data, and a control zone in which control data including band control data having a one-to-one correspondence with each band of the data zone is written, the device comprising:

recording means for writing user data in the data recording medium;

reproducing means for reading the user data and the control data from the data recording medium;

control data memory means for temporarily storing the control data read from the control zone by the reproducing means; and control means for respectively controlling the WRITE operation of the user data using the recording means and the READ operation of the user data using the reproducing means, based on the control data stored in the control data memory means.

9. A data recording and reproducing device according to claim 8, wherein the track of the data recording medium has a plurality of sectors, the data recording medium writes and reads data on a sector basis, and the control means sets the read and write control data of a band in which a target sector is positioned during a seek operation for detecting the target sector.

10. A format of a data recording medium, wherein a data zone and a control zone are allocated to the data recording medium, the data zone having a plurality of bands composed of at least one track, in which user data are written, the control zone having band control data written therein, each of the band control data corresponding to a respective one of the plurality of bands, wherein the band control data are independent from each other, and the band control data include read control data for a READ operation and write control data for a WRITE operation which are independent from each other.

* * * * *

UNITED STATES PATENT AND TRADEMARK OFFICE
CERTIFICATE OF CORRECTION

PATENT NO. : 5,568,467
DATED : October 22, 1996
INVENTOR(S) : Masahiro Inagaki et al.

It is certified that error appears in the above-indentified patent and that said Letters Patent is hereby corrected as shown below:

Column 13, claim 1, line 26, after "independent" delete "frown" and insert --from--.

Signed and Sealed this

Eighteenth Day of February, 1997

Attest:

BRUCE LEHMAN

*Attesting Officer*  *Commissioner of Patents and Trademarks*